Aug. 9, 1966  W. G. BOEHM  3,265,190
TILTING DISCHARGE CARRIER FOR CONVEYORS
Filed Dec. 2, 1964  2 Sheets-Sheet 1
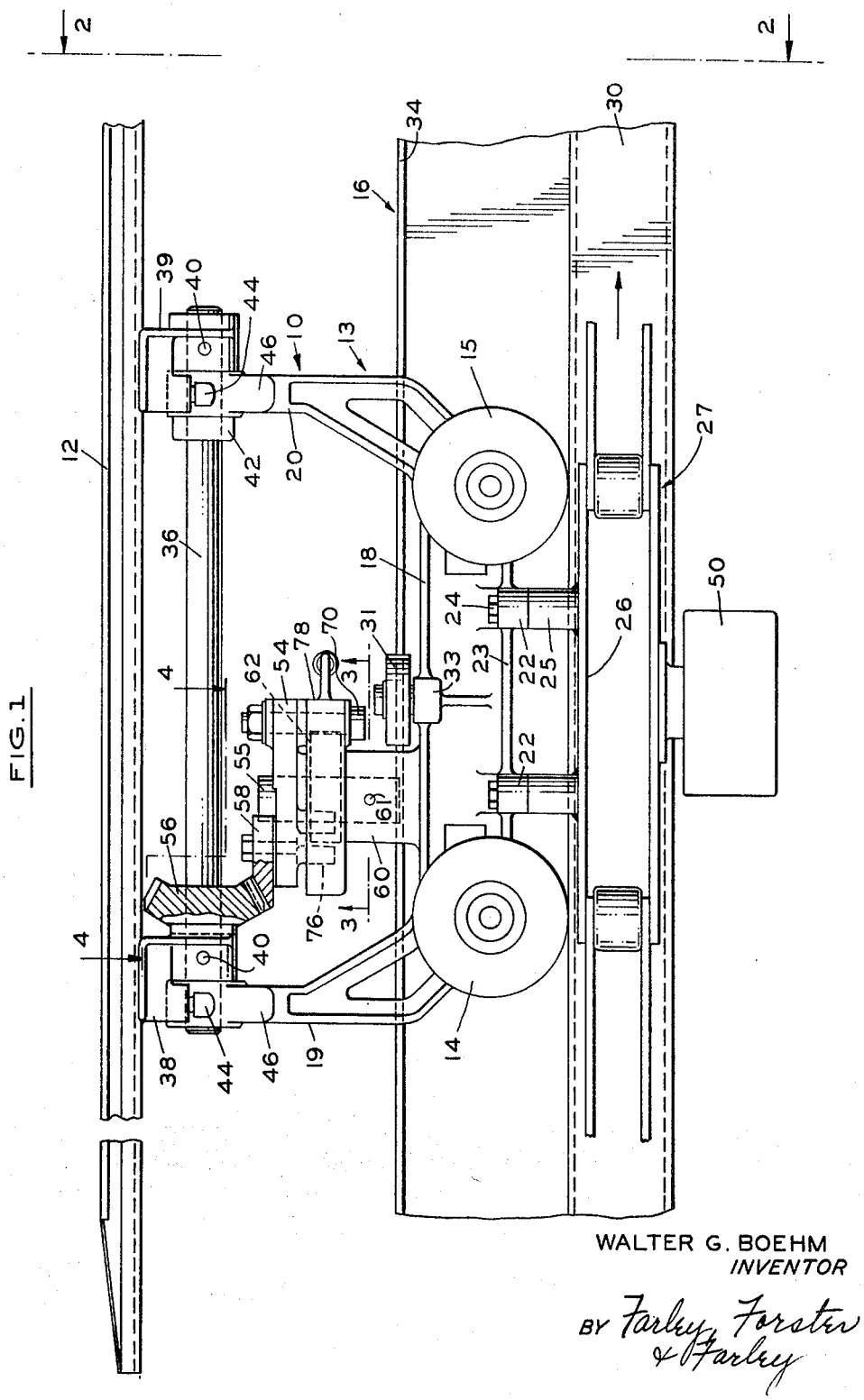
WALTER G. BOEHM
INVENTOR
BY Farley, Forster
& Farley
ATTORNEYS Aug. 9, 1966  W. G. BOEHM  3,265,190
TILTING DISCHARGE CARRIER FOR CONVEYORS
Filed Dec. 2, 1964  2 Sheets-Sheet 2
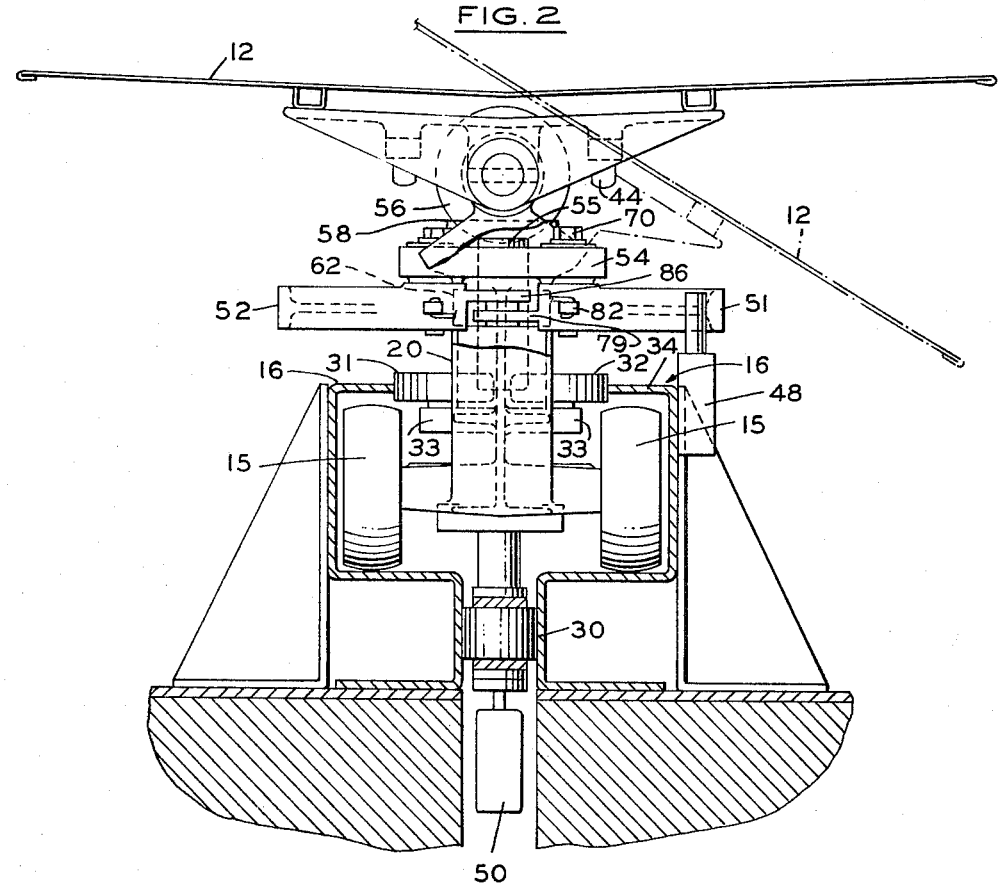
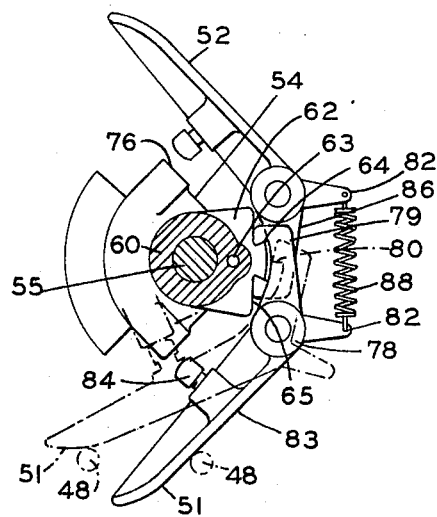
WALTER G. BOEHM
INVENTOR
BY Farley, Forster & Farley
ATTORNEYS United States Patent Office 3,265,190
Patented August 9, 1966

1

3,265,190
TILTING DISCHARGE CARRIER FOR
CONVEYORS
Walter G. Boehm, Birmingham, Mich., assignor to Jervis
B. Webb Company, Detroit, Mich., a corporation of
Michigan
Filed Dec. 2, 1964, Ser. No. 415,349
6 Claims. (Cl. 198—155)

This invention relates to an improved construction for a conveyor carrier of the type having a load support which can be tilted to discharge a load to one side of the path of travel of the conveyor in response to movement of the carrier past a tripping device at an unloading station. Carriers of this type are used for example in conveyors for sorting articles, and preferably, the load support is arranged so that it can be tilted to discharge the load to either side of the path of travel, thus serving a greater number of unloading stations.

The general object of the present invention is to provide a carrier of this type in which the load support is positively driven throughout its movement from a normal load carrying position to a tilted discharging position; in which a relatively rapid tilting movement can be obtained from normal to discharging position; and, in which a relatively great amount of tilting movement can be obtained for a given amount of movement of the carrier relative to the tripping device.

A carrier constructed in accordance with the invention includes a wheeled carriage or other suitable supporting structure on which a load carrying platform is pivotally mounted on an axis parallel to the path of travel for tilting movement from a normal position to a discharging position as the carrier passes an unloading station, and is characterized by an actuating member mounted on the carriage for rocking movement about an axis normal to the pivot axis of the load platform, gear means for translating rocking movement of the actuating member into tilting movement of the load support, a tripper lever adapted to engage a tripping device at the unloading station, means for mounting the tripper lever for movement relative to the carriage, and means for rocking the actuating member in response to movement of the tripper lever.

In the preferred construction to be disclosed herein the actuating member is provided with a pair of crank arms, the tripper lever is pivoted on one of these arms and when moved engages the other crank arm to impart rocking movement to the actuating member. This arrangement together with the gearing between the actuating member and load support enables the movement of a tripper lever to be amplified so that the load support can be tilted from normal to discharging position rapidly and with relatively little movement of the tripper lever. Amplification is also obtained in the preferred construction by mounting one element of the gear means on a crank-like portion of the actuating member.

The foregoing and other features and advantages of the invention will appear from the following description of the presently preferred representative embodiment disclosed in the accompanying drawings in which:

FIGURE 1 is a side elevation of a carrier, carrier supporting track and propelling chain;

FIGURE 2 is a sectional end elevation taken as indicated by the line 2—2 of FIG. 1;

2

FIG. 3 is a sectional plan view taken as indicated by the line 3—3 of FIG. 1; and FIGURE 4 is a fragmentary plan view of the actuating member and gearing taken as indicated by the line 4—4 of FIG. 1.

Referring to FIGS. 1 and 2 the carrier 10 consists of a load supporting tray 12 mounted on a carriage 13 equipped with pairs of wheels 14 and 15 which travel on channel-shaped tracks 16.

The carriage 14 includes a main frame casting formed with a lower portion 18 and upstanding end portions 19 and 20. Bosses 22 on the lower flange 23 of the portion 18 receive bolts 24 which engage lugs 25 secured to a link element 26 of a conventional roller chain 27. The roller chain 27 travels in a guideway 28 formed by vertical flanges 30 on the tracks 16, and the carriage 10 is additionally guided by a pair of guide rollers 31 and 32 which are mounted on bosses 33 on the upper flange of the frame portion 18 and engage the upper horizontal flanges 34 of the track 18 as shown in FIG. 2.

A shaft 36 is rotatably mounted in bearings formed at the upper end of each of the frame portions 19 and 20 and the load supporting tray 12 is mounted on the shaft for movement therewith by a pair of brackets 38 and 39 each connected to the shaft by a pin 40. These brackets 38 and 39 together with a collar 42 retain the tray and shaft in assembled relation with the carriage for tilting movement on an axis extending parallel to the path of travel of the carriage between a normal load carrying position shown in full line and a tilted discharging position indicated in broken line in FIG. 2, the load discharging position being defined by the engagement of bumpers 44 on the brackets 38 and 39 with downwardly sloping shoulders 46 on the frame portions 19 and 20.

Means are provided for selectively tilting the tray 12 to either side of the path of travel of the carriage as the carrier passes an unloading station, including tilting mechanism on the carrier, a tripping device 48 at the unloading station and a destination code carrying member 50 secured to and depending from the chain 27 in fixed relation to the carrier. Details of the construction of the tripping device 48 and code carrying member 50 are not shown, as they form no part of the present invention. Many such devices are available and for present purposes it is merely necessary to understand that when a particular carrier arrives at a particular unloading station identified by a code carried on the member 50, a tripping device 48 mounted on the side of the conveyor adjacent that unloading station is actuated and moved into the path of travel of a tripping lever 51 or a tripping lever 52 which extend to either side of the path of travel of the carrier as shown in FIG. 2.

The tilting mechanism includes, in addition to the tripping levers, an actuating member 54 mounted for rocking movement on a vertical shaft 55, means for rocking the actuating member in response to movement of a tripping lever, and gear means in the form of a pinion 56 and gear segment 58 for translating rocking movement of the actuating member 54 into tilting movement of the tray 12.

Details of this construction will now be given. As shown in FIG. 1, the carriage 14 is formed with a boss 60 which extends upwardly from the lower portion 18 of the carriage frame. The shaft 55 is mounted in a socket provided in this boss 60 and held there by a pin 61. A latch member 62, best shown in FIG. 3 is mounted on the shaft 55 adjacent the upper face of the boss 60 and is anchored in position by a vertical pin 63. This latch member 62 has a latch surface 64 and a positioning surface 65 on each side of the longitudinal center line of the carriage.

FIG. 4 best illustrates that the actuating member 54 is a compound crank in the sense that it incorporates structure forming a plurality of crank arms with reference to the center of the shaft 55. The tripping levers 51 and 52 are pivotally connected to arms 68 and 69 of the actuating member by bolts 70 and 71; portion 72 of the actuating member 54 serves as a crank to which the gear segment 58 is connected; and, portion 72 is also provided with depending lugs 75 and 76 which provide abutments for imparting rocking movement to the actuating member 54 in response to pivotal movement of either of the tripping levers 51 or 52.

The tripping lever 51 is formed with a boss portion 78 bored to receive the bolt 70, with a latch arm 79 having a projecting end portion 80, with a horn 82, and with an arm portion 83 provided with an adjustable bumper 84. Tripping lever 52 is identical in construction except that when the parts are assembled as shown in FIG. 2, the latch arm 86 of the lever 52 extends in vertically spaced overlapping relation with the latch arm 79 of the lever 51. A spring 88 is connected between the horns 82 of the levers urging them to a locking position in which the surfaces 64 of the fixed latch member 62 are engaged between the latch arms 79 and 86.

When the tray 12 is in a horizontal load carrying position as shown in full line in FIG. 2, the parts of the tilting mechanism are in the normal position shown in full line in FIG. 3, and the tray and tilting mechanism are retained in this position by the overlapping engagement of the surfaces 64 of the latch member 62 and the projecting end portions 80 of each of the latch arms 79 and 86 of the tripping levers. These overlapping surfaces 64 and 80 are substantially circumferentially formed relative to the pivotal axis of the respective tripping levers 51 and 52. When either of the tripping levers 51 or 52 on a moving carriage is actuated by striking a tripping device 48 projecting into the path of travel of a tripping lever at an unloading station, the tripping lever is pivoted to move the projecting end portion 80 of its latch out of overlapping engagement with a latch surface 64 and its bumper 84 into abutting engagement with one of the lugs 75 or 76 on the actuating member 54.

This is illustrated in broken line in FIG. 3 where the tripping lever 51 has moved to such position. Further forward movement of the carriage will be accompanied by rocking movement of the operated tripping lever and the actuating member 54 about the axis of the shaft 55, this movement being translated into tilting movement of the tray 12 to a discharging position by the gear segment 58 and pinion 56. The non-actuated tripping lever—the lever 52 in the example shown—moves with the actuating member and the projecting end portion 80 on its latch arm 86 slides on the positioning surface 65 of the latch 62 away from the latch surface 64. Tilting of the tray 12 takes place positively and at a rate proportional to the speed of carriage travel as amplified to the extent desired by the ratio between the crank arms of the tripping levers and gear segment provided on the actuating member and between the gear segment and pinion. The direction of tilting movement is toward the side of the carriage carrying the actuated tripping lever.

Means for returning the tray from tilted to load carrying position may be provided on the carriage if desired; however, camming device adjacent the path of carriage travel will ordinarily be preferable for this purpose.

While preferred embodiments have been described above in detail, it will be understood that numerous modifications might be resorted to without departing from the scope of the invention as defined in the following claims.

I claim:

1. A carrier of the type described including a wheeled carriage having a load supporting tray pivotally mounted thereon and means for tilting the tray from a normal position to a load discharging position as the carrier passes a tripping device at an unloading station, characterized by the tray tilting means comprising:
    (a) an actuating member mounted on the carriage for rocking movement;
    (b) a tripping lever adapted to engage the tripping device;
    (c) means mounting the tripping lever for pivotal movement relative to the actuating member and carriage in response to such engagement;
    (d) means for imparting rocking movement to the actuating member in response to movement of the tripping lever;
    (e) and gear means for translating rocking movement of the actuating member into tilting movement of the load supporting tray.

2. A carrier as claimed in claim 1 further characterized by means for latching the load supporting tray in normal position and for unlatching the tray for pivotal movement to the load discharging position in response to pivotal movement of the tripping lever.

3. A carrier of the type described consisting of a wheeled carriage having a load support pivotally mounted thereon and means for tilting the support from a normal position to a discharging position as the carrier passes a tripping device at an unloading station characterized by
    (a) a pivot shaft connecting the load support to the carriage;
    (b) an actuating member pivotally mounted on the carriage on an axis normal to the axis of the shaft;
    (c) a pair of tripping levers connected to the actuating member on a pair of pivots spaced radially and circumferentially of the pivotal axis of the actuating member, said levers extending laterally to either side of the carriage for selective engagement with a tripping device;
    (d) oppositely disposed latch surfaces on the carriage, a latch portion on each tripper lever engageable with one of the latch surfaces and means normally urging the tripper levers into engagement with the latch surfaces;
    (e) means for imparting rocking movement to the actuating member in response to movement of either of the tripping levers;
    (f) and gear means for translating rocking movement of the actuating member into tilting movement of the load support.

4. A carrier as claimed in claim 3 wherein the said means for imparting rocking movement to the actuating member comprises an abutment between each tripper lever and the actuating member engageable in response to pivotal movement of a tripping lever by a tripping device to a position in which the latch portion on such tripping lever has disengaged from its latch surface.

5. A carrier as claimed in claim 3 wherein the means for translating rocking movement of the actuating member into tilting movement of the load support includes a gear segment secured to the actuating member and a pinion keyed to the pivot shaft of the load support.

6. A carrier of the type described consisting of a wheeled carriage having a load support pivotally mounted thereon and means for tilting the support from a normal position to a discharging position as the carrier passes a tripping device at an unloading station characterized by
    (a) a pivot shaft connecting the load support to the carriage;
    (b) an actuating member pivotally mounted on the carriage on an axis normal to the axis of the shaft;
    (c) a pair of tripping levers connected to the actuating member on a pair of pivots spaced radially and circumferentially of the pivotal axis of the actuating member, said levers extending laterally to either side of the carriage for selective engagement with a tripping device;

(d) a pair of oppositely facing spaced latch surfaces on the carriage, each tripping lever including a latch arm having a portion adapted to overlappingly engage one of said latch surfaces, and spring means interconnecting the tripping levers to normally urge the latch arms thereof into engagement with said latch surfaces;

(e) means for imparting rocking movement to the actuating member in response to pivotal movement of either of the tripping levers to a position in which the latch arm thereof has disengaged from its latch surface; and (f) gear means for translating rocking movement of the actuating member into tilting movement of the load support.

References Cited by the Examiner

UNITED STATES PATENTS

| | | | |
|---|---|---|---|
| 3,119,488 | 1/1964 | Rabinow et al. | 198—38 X |
| 3,150,763 | 9/1964 | Immesberger | 198—38 |
| 3,167,192 | 1/1965 | Harrison et al. | 214—62 |

EVON C. BLUNK, *Primary Examiner.*

R. E. KRISHER, *Assistant Examiner.*